United States Patent
Nunokawa

(10) Patent No.: US 11,416,721 B2
(45) Date of Patent: Aug. 16, 2022

(54) HAND-HELD PRINTER HAVING A CAMERA FOR OBTAINING IMAGE DATA USED TO NOTIFY A USER THAT A POSITION HAS BEEN REACHED

(71) Applicant: CASIO COMPUTER CO., LTD., Tokyo (JP)

(72) Inventor: Masato Nunokawa, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/653,300

(22) Filed: Oct. 15, 2019

(65) Prior Publication Data
US 2020/0167615 A1 May 28, 2020

(30) Foreign Application Priority Data
Nov. 27, 2018 (JP) .............................. JP2018-221527

(51) Int. Cl.
G06K 15/00 (2006.01)
G06K 15/02 (2006.01)
G06K 15/10 (2006.01)

(52) U.S. Cl.
CPC ......... G06K 15/005 (2013.01); G06K 15/102 (2013.01); G06K 15/1822 (2013.01)

(58) Field of Classification Search
CPC ........................................................ B41J 3/36
See application file for complete search history.

(56) References Cited

U.S. PATENT DOCUMENTS

| | | | |
|---|---|---|---|
| 10,799,009 B2 | 10/2020 | Katsuyama | |
| 2008/0007762 A1* | 1/2008 | Robertson | B41J 3/36 358/1.15 |
| 2008/0024583 A1* | 1/2008 | Noe | B41J 3/28 347/109 |
| 2008/0075512 A1* | 3/2008 | Gates | H04N 1/107 400/88 |
| 2017/0274691 A1* | 9/2017 | Nakahara | B41J 29/38 |
| 2018/0170080 A1* | 6/2018 | Suzuki | B41J 25/001 |
| 2018/0178557 A1* | 6/2018 | Nakazawa | B41J 3/36 |
| 2019/0307231 A1* | 10/2019 | Katsuyama | G06T 7/74 |
| 2020/0079109 A1* | 3/2020 | Ota | B41J 3/36 |
| 2020/0084336 A1* | 3/2020 | Tanaka | H04N 1/00814 |

FOREIGN PATENT DOCUMENTS

| | | |
|---|---|---|
| JP | 2001225512 A | 8/2001 |
| WO | 2018117022 A1 | 6/2018 |

OTHER PUBLICATIONS

Japanese Office Action (and English language translation thereof) dated Sep. 7, 2021 issued in counterpart Japanese Application No. 2018-221527.

* cited by examiner

*Primary Examiner* — Benjamin O Dulaney
(74) *Attorney, Agent, or Firm* — Holtz, Holtz & Volek PC

(57) ABSTRACT

An applicator device includes a printing head that applies a material to a target, a camera that captures an image of the target, and a processor. In the case where the applicator device moves relative to the target or the target moves relative to the applicator device and an application area of the target in the image reaches a particular position in the image, the processor performs a notification process to notify that the application area has reached the particular position.

11 Claims, 10 Drawing Sheets

HAND-HELD PRINTER HAVING A CAMERA FOR OBTAINING IMAGE DATA USED TO NOTIFY A USER THAT A POSITION HAS BEEN REACHED

CROSS-REFERENCE TO RELATED APPLICATIONS

This application is based upon and claims the benefit of priority under 35 USC 119 of Japanese Patent Application No. 2018-221527 filed on Nov. 27, 2018, the entire disclosure of which, including the description, claims, drawings, and abstract, is incorporated herein by reference in its entirety.

FIELD

The present disclosure relates to an applicator device, an external device, and an applicator system.

BACKGROUND

Unexamined Japanese Patent Application Kokai Publication No. 2001-225512 describes a handy printer that applies a material by a recording head onto recording paper while a body of the printer is being moved manually on the recording paper.

SUMMARY

According to one aspect of the present disclosure, an applicator device includes a printing head that applies a material to a target, a camera that captures an image of the target, and a processor. In that case where the applicator device moves relative to the target or the target moves relative to the applicator device and an application area of the target in the image reaches a particular position in the image, the processor performs a notification process to notify that the application area has reached the particular position.

According to another aspect of the present disclosure, an external device includes a communicator that communicates with an application device that applies a material to a target and captures an image of the target, and a processor. The processor obtains the image from an applicator device to which the communicator communicates, and in that case where the applicator device moves relative to the target or the target moves relative to the applicator device and an application area of the target in the image reaches a particular position in the image, the processor performs a notification process to notify that the application area has reached the particular position.

According to yet another aspect of the present disclosure, an applicator system includes an applicator device and an external device. The application device includes a printing head that applies a material to a target, a camera that captures an image of the target, a first communicator that communicates with an external device, and a first processor. The external device includes a second communicator that communicates with the applicator device, and a second processor. In that case where the applicator device moves relative to the target or the target moves relative to the applicator device and an application area of the target in the image reaches a particular position in the image, the first processor or the second processor performs a notification process to notify that the application area has moved to the particular position.

BRIEF DESCRIPTION OF THE SEVERAL VIEWS OF THE DRAWING

A more complete understanding of this application can be obtained when the following detailed description is considered in conjunction with the following drawings, in which.

DETAILED DESCRIPTION OF THE INVENTION

Embodiment 1

Figure 1:
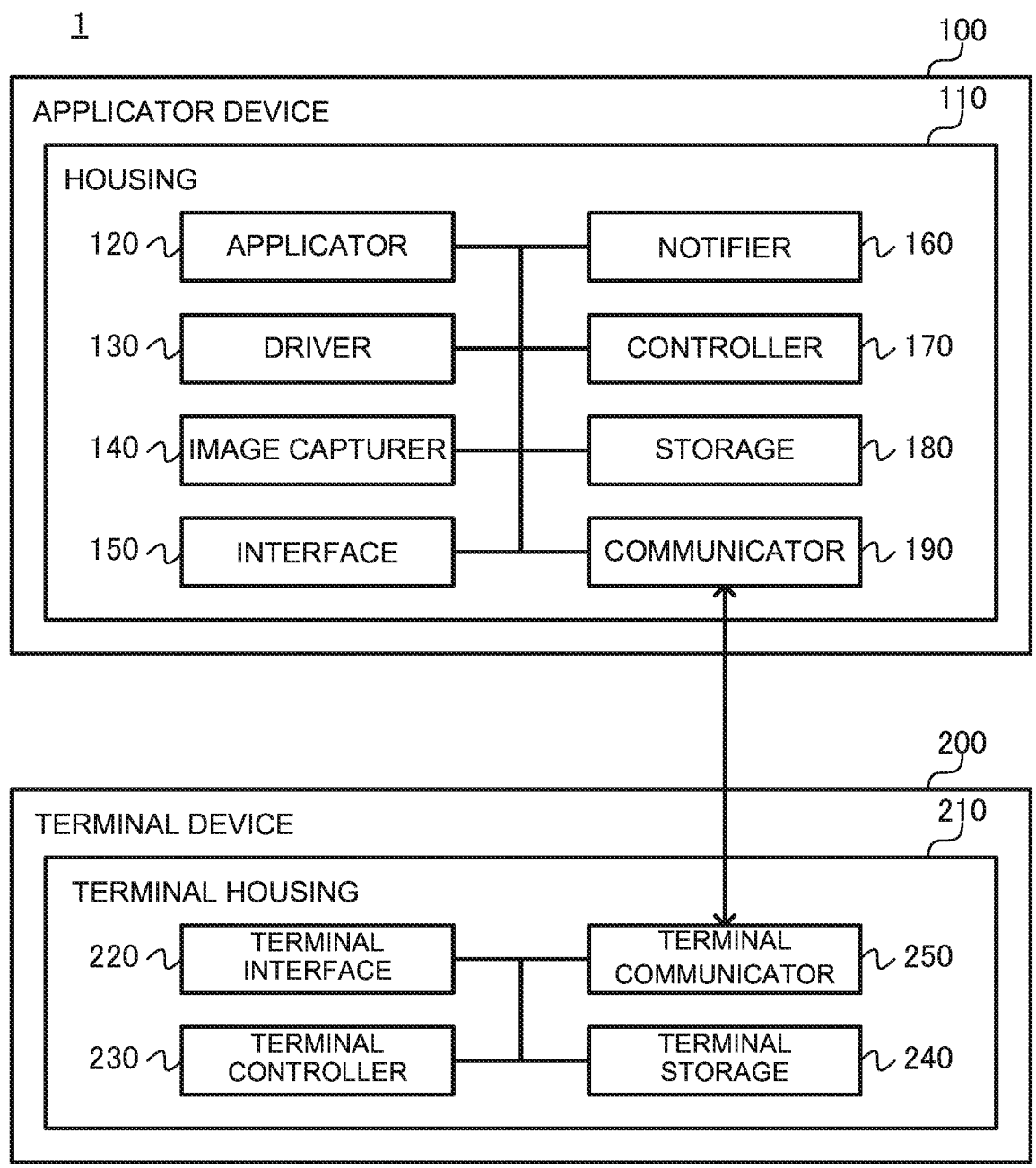
FIG. 1 is a block diagram illustrating a configuration of an applicator system according to Embodiment 1.

An applicator system 1 according to Embodiment 1 is described with reference to the drawings. Note that, in the drawings, identical or corresponding components are marked with the same reference numerals.

The applicator system 1 includes an applicator device 100 and a terminal device 200. The applicator system 1 is a system for capturing an image of a target 2, displaying the image of the target 2 to a user, and applying a material to the target 2. The applicator device 100 captures an image of the target 2, being held by a user, and provides image data of the target 2 to the terminal device 200. The terminal device 200 displays the image of the target 2 captured by the applicator device 100 and provides the image to the user. The applicator device 100 applies a material to the target 2, being grasped by the user viewing the image of the target 2 displayed on the terminal device 200.

The target 2 is a target to which the material is applied by the applicator device 100. Examples of the target 2 can include human skin, paper, print labels, a cardboard box, resin, metal, wood, rubber, and cloths, but the target 2 is not limited thereto. The target 2 may be any type of object as long as it has properties of material to which a material to be applied is attachable and a state of a surface in which the material to be applied is attachable.

The material is applied to the target 2 by the applicator device 100. Examples of the material to be applied can include concealer for hiding a dark area or a spot on the target 2, ink, and the like, but the material is not limited thereto.

FIG. 1 is a block diagram illustrating a configuration of the applicator system 1 according to Embodiment 1. As illustrated in FIG. 1, the applicator device 100 included in the applicator system 1 includes a housing 110, an applicator 120, a driver 130, an image capturer 140, an interface 150, a notifier 160, a controller 170, a storage 180, and a communicator 190.

Figure 2A:
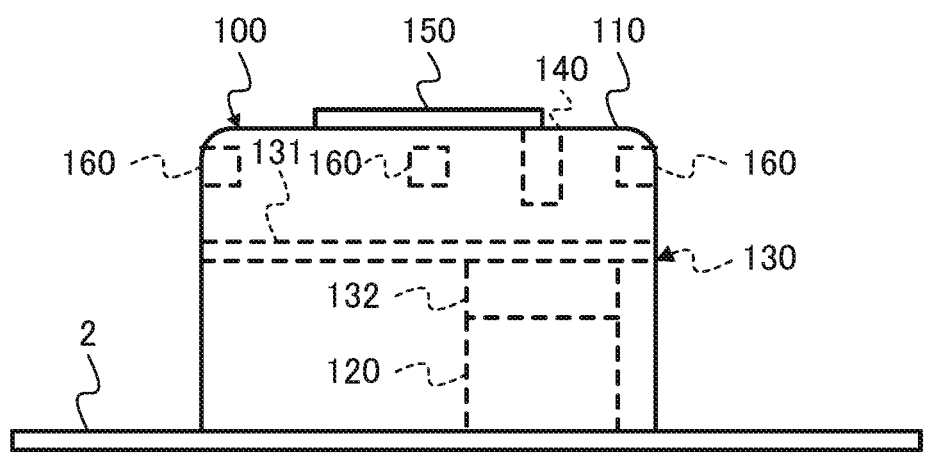
FIG. 2A is a side view of an applicator device according to Embodiment 1.
Figure 2B:
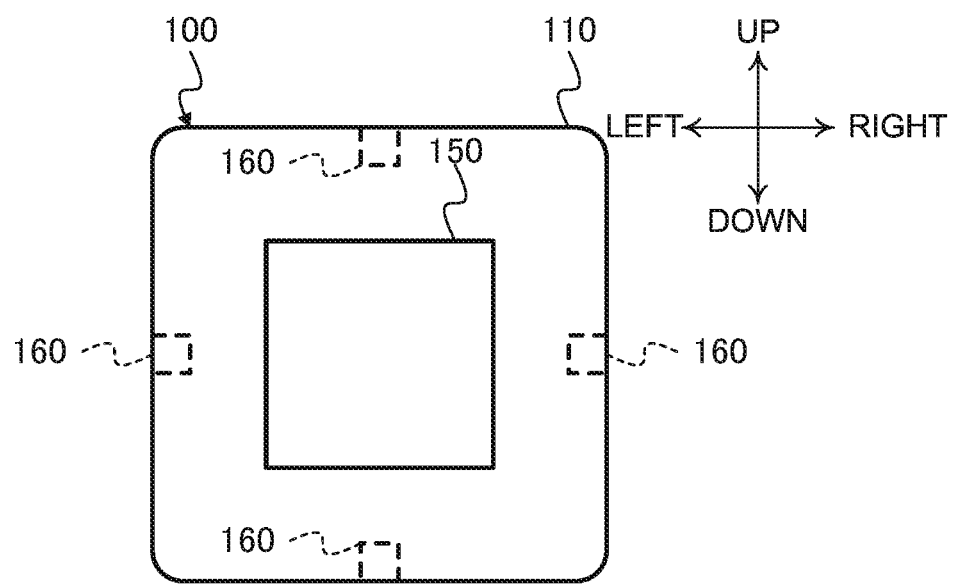
FIG. 2B is a top view of the applicator device according to Embodiment 1.
Figure 2C:
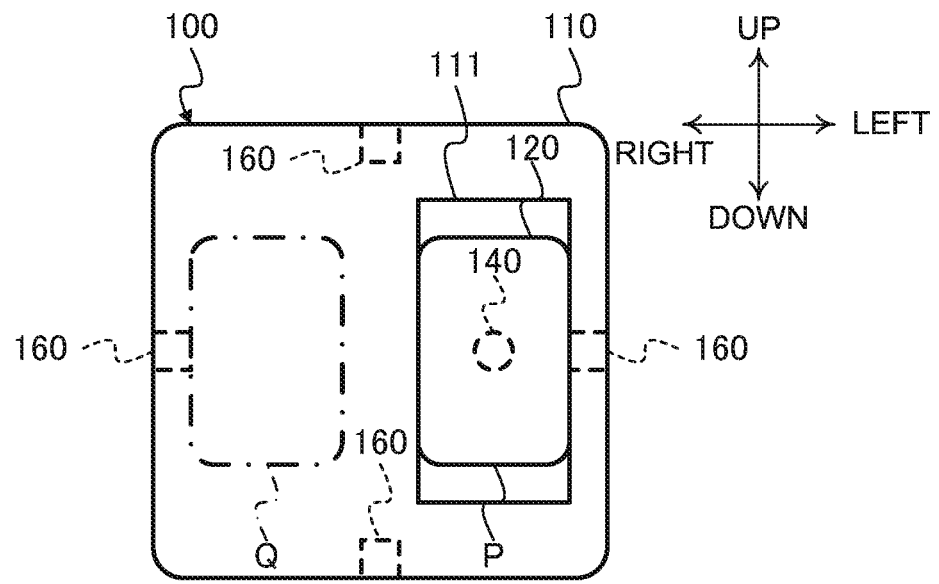
FIG. 2C is a bottom view of the applicator device according to Embodiment 1.

FIGS. 2A, 2B, and 2C are side, top, and bottom views of the applicator device 100, respectively. For ease of illustration, up and down and left and right indicated in FIG. 2B are taken as up and down and left and right of the applicator device 100. It is assumed that the applicator device 100 is held such that an upper side of the applicator device 100 for a user is always held upward. However, in practice, the applicator device 100 may be held by the user in any orientation.

As illustrated in FIG. 1, the housing 110 houses components of the applicator device 100, that is, the applicator 120, the driver 130, the image capturer 140, the interface 150, the notifier 160, the controller 170, the storage 180, and the communicator 190. As illustrated in FIG. 2A, the interface 150 always exposes from the housing 110. As illustrated in FIG. 2C, the housing 110 has an opening 111 on one side of a surface (bottom surface) of the housing 110 that contacts the target 2, and the applicator 120 or the image capturer 140 is exposed through the opening 111 from the housing 110, depending on positioning of the driver 130. The housing 110 is made of resin and metal, but not limited thereto. The housing 110 includes a board and a battery inside, which are not illustrated.

With reference back to FIG. 1, the applicator 120 is disposed on the driver 130, and can be exposed from the opening 111 of the housing 110 to apply the material to the target 2. The applicator 120 includes a tank filled with the material to be applied and a printing head that jets the material in the tank. The tank supplies the material to the printing head. The printing head includes nozzles and jets the material through each nozzle to the target 2.

The driver 130 is disposed inside the housing 110 and moves the applicator 120 mounted on the driver 130. The driver 130 includes rails 131 and an actuator 132, and the actuator 132 is driven to move along on the rails 131. The driver 130 moves to the side (position P) where the opening 111 of the housing 110 exists, thereby causing the applicator 120 to be exposed from the opening 111. In contrast, the driver 130 moves to the other side (position Q), thereby causing the image capturer 140 to be exposed from the opening 111. The driver 130 stands by at the position P in a state in which image capturing or applying is not performed by the applicator device 100, that is, in a standby state.

The image capturer 140, an example of which is a camera, can be exposed through the opening 111 of the housing 110 and capture an image of the target 2 to obtain image data. An imaging coverage of the image capturer 140 includes at least an area in which the material can be applied by the applicator 120. The image data obtained by the image capturer 140 can include a still image or a moving image. The image capturer 140 provides the controller 170 with the obtained image data of the target 2. The image capturer 140 includes a lens, a focusing mechanism, and an image sensor, but components of the image capturer 140 are not limited thereto.

The interface 150 receives a user input including instructions of start of capturing, start of application, and end of capturing, and provide a user with information. The interface 150 provides the controller 170 with the received instruction of the start of capturing, the start of application, or the end of capturing, and provides the user with information obtained from the controller 170. Examples of the interface 150 can include a button, a key, or a touch pad that receives a user input, a liquid crystal display or a speaker that provides a user with information, or a touch panel that can take both the roles, but components of the interface 150 are not limited thereto.

The notifier 160 notifies a user of information indicating which way the user should move the applicator device 100. The notifier 160 is disposed on each of four side surfaces of the housing 110. The notifier 160 can include a vibrating element such as a motor, but is not limited thereto.

The controller 170 is a processing device that controls the applicator device 100 by executing a program. The controller 170 can include a processor (first processor), such as a central processing unit (CPU), but is not limited thereto.

Upon the interface 150 receiving an instruction of start of capturing, the controller 170 controls the driver 130 to move the applicator 120 to the position Q that is out of an angle of view of the image capturer 140, and to make the image capturer 140 exposed via the opening 111 from the housing 110. The controller 170 controls the image capturer 140 to start capturing of an image of the target 2, and transmits an instruction of start of capturing via the communicator 190 to the terminal device 200. The controller 170 receives the image data of the target 2 from the image capturer 140 and transmits the image data via the communicator 190 to the terminal device 200.

Upon the interface 150 receiving an instruction of end of capturing or start of application, the controller 170 transmits an instruction of end of capturing or start of application via the communicator 190 to the terminal device 200, and controls the image capturer 140 to end the capturing of the image of the target 2. The controller 170 controls the driver 130 to move the applicator 120 to the position Q and make the applicator 120 exposed via the opening 111 from the housing 110.

Upon receiving the image data of the target 2 from the image capturer 140, the controller 170 analyzes the received image data and specifies as a spot area S a portion corresponding to the spot in the image. For example, the controller 170 extracts brightness component (brightness information) of the image data of the target 2, and determines that a portion where low brightness points are concentrated is a spot and specifies the portion as the spot area S. The spot area S is also referred to as an application area.

The controller 170 sets detection areas at up and down ends and left and right ends in the image of the target 2. The widths of the detection areas correspond to, for example, one tenth of the short sides of the image of the target 2, and are not limited thereto. When the spot area S overlaps the detection area, the controller 170 controls a notifier 160 of the four notifiers 160, located on a surface of the applicator device 100 corresponding to the detection area where the spot area S overlaps, to vibrate so as to notify the user of the spot area S being about to be out of the imaging coverage (angle of view) of the image capturer 140.

Figure 3A:
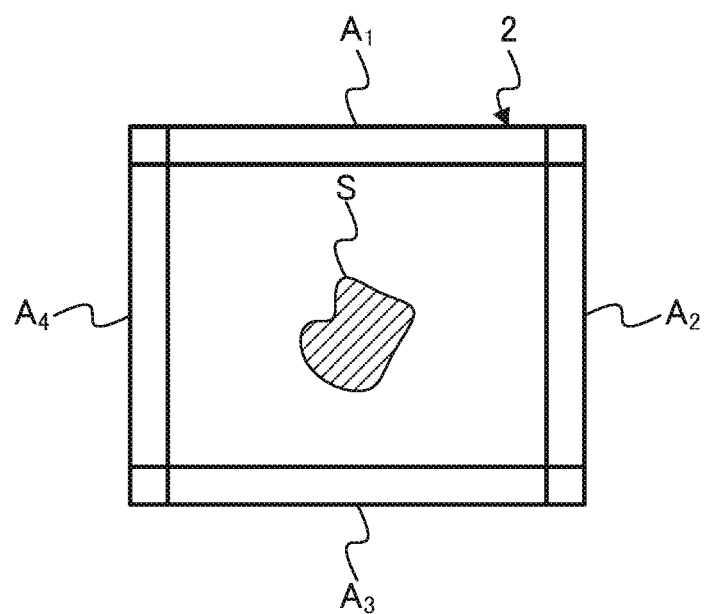
FIG. 3A is a drawing illustrating a target before movement captured by an image capturer according to Embodiment 1.
Figure 3B:
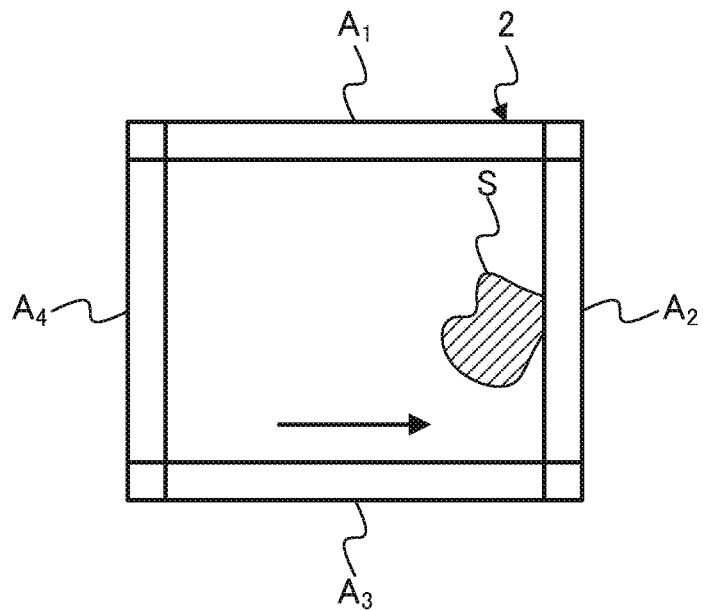
FIG. 3B is a drawing illustrating a target after movement captured by an image capturer according to Embodiment 1.

FIG. 3A is a drawing illustrating an image of the target 2 before movement captured by an imager capturer 140. FIG. 3B is a drawing illustrating an image of the target 2 after movement captured by the image capturer 140. As illustrated in FIG. 3A, the controller 170 specifies as the spot area a portion in which low brightness points are concentrated. The controller 170 sets as detection areas $A_1$, $A_2$, $A_3$, and $A_4$ at upper, right, bottom, and left end portions of the image of the target 2, respectively.

As illustrated in FIG. 3B, the spot area S shifts to the right on the image of the target 2 upon a user's moving the applicator device 100 to the left. Upon the spot area S overlapping the detection area $A_2$ located at the right end portion of the image, the controller 170 controls the notifier 160, disposed on the right end portion of the applicator device 100, to be vibrated.

Upon the interface 150 receiving an instruction of the start of application, the controller 170 controls the driver 130 to move the applicator 120 to the position P from the positon Q that is out of the angle of view of the image capturer 140, and controls the applicator 120 to apply the material to the target 2. The applicator 120 may be moved to a portion of the target 2 corresponding to the spot area S on the image of the target 2. At this time, the housing 110 is held by the user to touch the target 2.

The storage 180 stores a program and data for the controller 170 to execute processing and functions as work area for the controller 170 to execute the processing. The storage 180 can store a program for controlling the applicator 120 to apply a material and a program for controlling the image capturer 140 to capture an image of the target 2, but the target to be stored is not limited thereto. The storage 180 can include a read only memory (ROM) and a random access memory (RAM), but components of the storage 180 are not limited thereto.

The communicator 190 communicates with the terminal device 200 via a terminal communicator 250 later described, and exchanges information therewith. The communicator 190 generally performs communication by a wireless local area network (LAN), but a method for communication by the communicator 190 is not limited thereto and any wireless communication or wired communication can be selected. The communicator 190 can be referred to as a transmitter 190.

The terminal device 200 (external device) includes a terminal housing 210, a terminal interface 220, a terminal controller 230, a terminal storage 240, and a terminal communicator 250. Examples of the terminal can include a smartphone, a tablet, and a mobile phone, but the terminal is not limited thereto.

Figure 4:
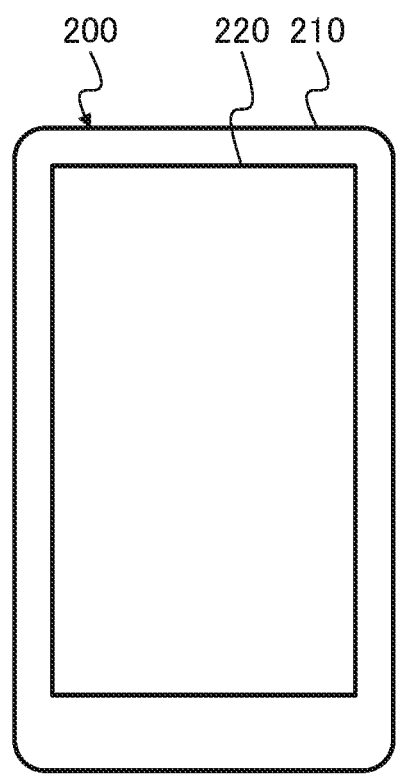
FIG. 4 is a plan view of a terminal device according to Embodiment 1.

The terminal housing 210 houses components of the terminal device 200, that is, the terminal interface 220, the terminal controller 230, the terminal storage 240, and the terminal communicator 250. FIG. 4 is a plan view of the terminal device 200. As illustrated in FIG. 4, the terminal interface 220 is exposed from the terminal housing 210. The terminal housing 210 is made of resin and metal, but not limited thereto. The terminal housing 210 includes a board and a battery inside, which are not illustrated.

With reference back to FIG. 1, the terminal interface 220 receives a user input and provides a user with information including the image of the target 2 transmitted by the applicator device 100. Examples of the terminal interface 220 can include a touch panel and a speaker, but components of the terminal interface 220 are not limited thereto. The terminal interface 220 can be referred to as a display 220.

The terminal controller 230 is a processing device for control the terminal device 200 by executing a program. The terminal controller 230 can include a processor (second processor), such as a CPU, but is not limited thereto.

Upon receiving the instruction of the start of capturing and the image data of the target 2 via the terminal communicator 250 from the applicator device 100, the terminal controller 230 controls the terminal interface 220 to display the image of the target 2. Upon receiving the instruction of the end of capturing or the start of application via the terminal communicator 250 from the applicator device 100, the terminal controller 230 controls the terminal interface 220 to end the display of the image of the target 2.

The terminal storage 240 stores a program and data for the terminal controller 230 to execute processing and functions as work area for the terminal controller 230 to execute the processing. The terminal storage 240 can store a program for controlling the terminal interface 220 to display the image of the target 2, but the target to be stored is not limited thereto. The terminal storage 240 can include a ROM and a RAM, but components of the terminal storage 240 are not limited thereto.

The terminal communicator 250 communicates with the applicator device 100 via the communicator 190, and exchanges information therewith. The terminal communicator 250 performs communication by a method similar to the method for the communicator 190 to perform communication. The terminal communicator 250 can be referred to as a receiver 250.

Figure 5:
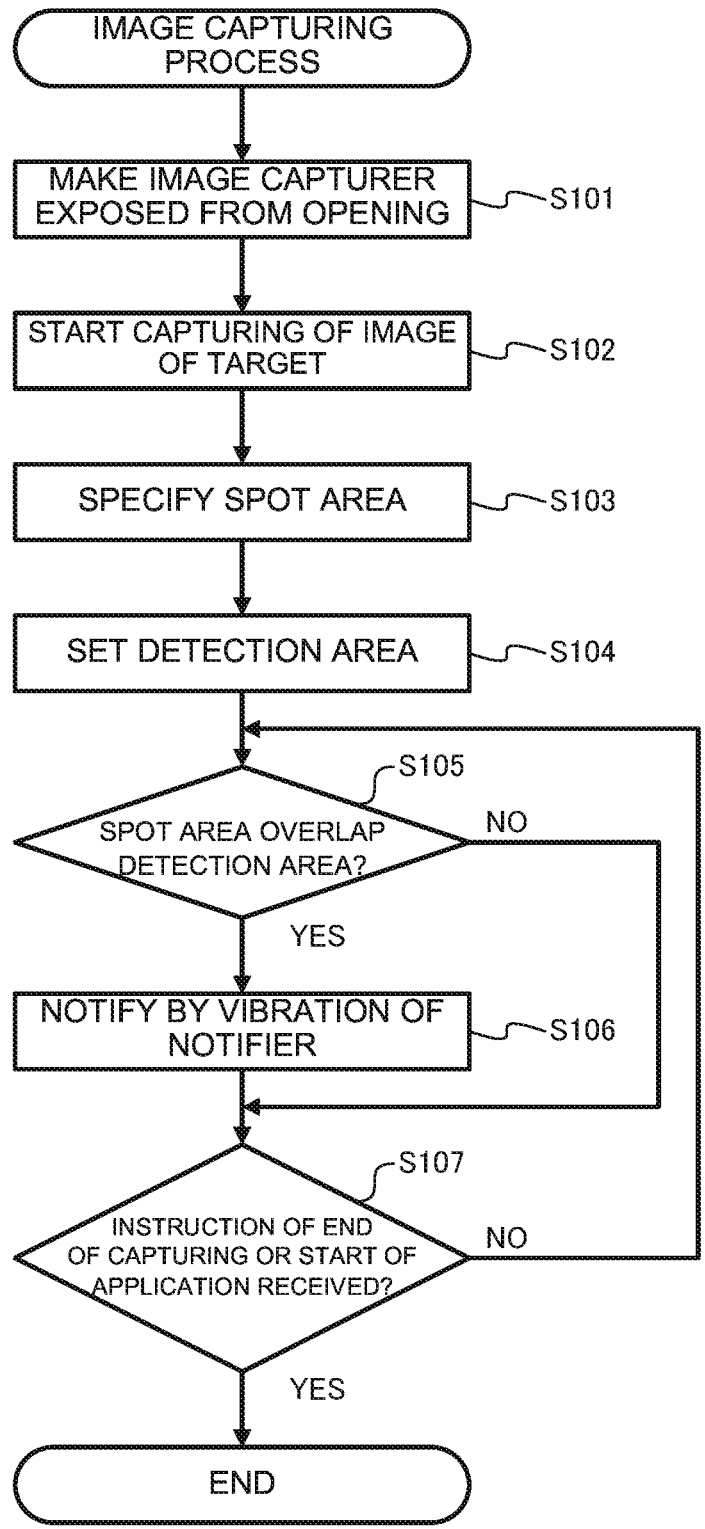
FIG. 5 is a flow chart of an image capturing process executed by the applicator system according to Embodiment 1.

An image capturing process executed by the applicator system 1 according to Embodiment 1 is described. FIG. 5 is a flow chart of an image capturing process executed by the applicator system 1. The image capturing process is described with reference to the flow chart of FIG. 5.

Upon the interface 150 receiving the user instruction of the start of capturing and the controller 170 receiving the instruction of the start of capturing from the interface 150, the image capturing process starts. Upon the start of the image capturing process, the controller 170 controls the driver 130 to move the applicator 120 to the position Q and make the image capturer 140 exposed from the opening 111 (Step S101).

Upon the controller 170 controlling the driver 130 to move the applicator 120, the controller 170 controls the image capturer 140 to start capturing the image of the target 2 (Step S102).

Upon starting capturing the image of the target 2, the controller 170 receives the image data of the target 2 obtained by the image capturer 140 and analyzes the received image data to specify the spot area S (Step S103).

Upon specifying the spot area S, the controller 170 sets the detection areas at up and down ends and left and right ends in the image of the target 2 (Step S104). The positions of the detection areas are not limited thereto, and is freely selectable.

Upon setting the detection areas, the controller 170 determines whether the spot area S overlaps a detection area (Step S105). When the controller 170 determines that the spot area S does not overlap the detection area (No in Step S105), the process proceeds to Step S107.

When the controller 170 determines that the spot area S overlaps the detection area (Yes in Step S105), the controller 170 controls a notifier 160, located on a surface of the applicator device 100 corresponding to the detection area where the spot area S overlaps, to vibrate so as to provide notification (notification process) (Step S106), and the process proceeds to Step S107.

The controller 170 determines whether the interface 150 receives the instruction of the end of capturing or the start of application (Step S107). When the controller 170 determines that the interface 150 does not receive the instruction (No in Step S107), the process returns to Step S105.

When the controller 170 determines that the interface 150 receives the instruction of the end of capturing or the start of application (Yes in Step S107), the image capturing process ends.

During execution of the image capturing process, the controller 170 transmits, via the communicator 190 to the terminal device 200, the image data of the target 2 received from the image capturer 140

During execution of the image capturing process, the terminal controller 230 of the terminal device 200 receives via the terminal communicator 250 the image data of the target 2 transmitted by the applicator device 100, and controls the terminal interface 220 to display the received image of the target 2.

The user recognizes the position of the applicator device 100 based on the image of the target 2 displayed on the terminal interface 220 and the notification by vibration of the notifier 160, and moves the applicator device 100 to a place where the user desires to apply the material. When the user determines that the applicator device 100 is moved to the place where the user desires to apply the material, the user inputs an instruction of start of application via the interface 150 to the applicator device 100.

In the present embodiment, the controller 170 analyzes the received image data and specifies the application area S, set the detection areas at up and down ends and left and right ends in the image of the target 2, or determines whether the application area S overlaps the detection area. However, the terminal controller 230 of the terminal device 200 may, based on the image data of the target 2 received from the communicator of the applicator device 100, analyzes the received image data and specifies the application area S, sets the detection areas at up and down ends and left and right ends in the image of the target 2, or determines whether the application area S overlaps the detection area, and thereby transmits the result from the terminal device 200 via the terminal communicator 250 and the communicator 190 to the applicator device 100 and the controller 170 of the applicator device 100 may use the result to execute the subsequent processes.

Upon input of the instruction of the start of application by the user via the interface 150 during execution of the image capturing process, the controller 170 controls the applicator 120 to apply the material to the target 2 so as to hide a spot.

For example, when the target 2 is a face of a user, the user cannot get a direct vision of the target 2, and thus it may occur for the user to move the applicator device 100 to a place where the user desires to apply the material. Even in a case where the user moves the applicator device 100 while looking in the mirror, the user may fail to intuitively know which way to move the applicator device, for example, because the place such as a spot to which the user desires to apply the material is hidden by the applicator device 100 itself or because video displayed on the terminal device 200 has a different orientation from the image on the mirror because of the image being reversed on the mirror.

A user may fail to know which way to move the applicator device 100, and thus may move the applicator device 100 for the spot to be located far away from the center of the applicator device 100. Even in such a case, the applicator system 1 can vibrate the notifier 160 when the spot area S overlaps the detection area that is the outer periphery of the imaging coverage of the image capturer 140, thereby notifying the user of the spot area S to which the material is to be applied being far away from the coverage in which the material is applicable.

The applicator system 1 according to Embodiment 1 with such a configuration specifies the spot area S with the image of the target 2 and provides notification when the specified spot area S moves out of an angle of view. Specifically, specifying the spot area S and setting the detection area, and when the spot area S overlaps the detection area, notifying a user of the fact, facilitate movement of the applicator device 100 to the place where the user desires to apply the material even when the user fails to directly see the target.

For example, when the user tries to apply a material to her own face, the user may intuitively know which way to move the applicator device 100 even if she looks at video displayed on the terminal device 200 since the user is accustomed to looking in the mirror. The applicator system 1 enables the user to intuitively determine which way to move the applicator device 100 by vibrating the notifier 160 corresponding to the detection area where the spot area S overlaps.

Embodiment 2

An applicator system 1 according to Embodiment 2 is described with reference to the drawings. In the applicator system 1 according to Embodiment 2, a terminal device 200 is in charge of image processing and notification to a user.

Figure 6:
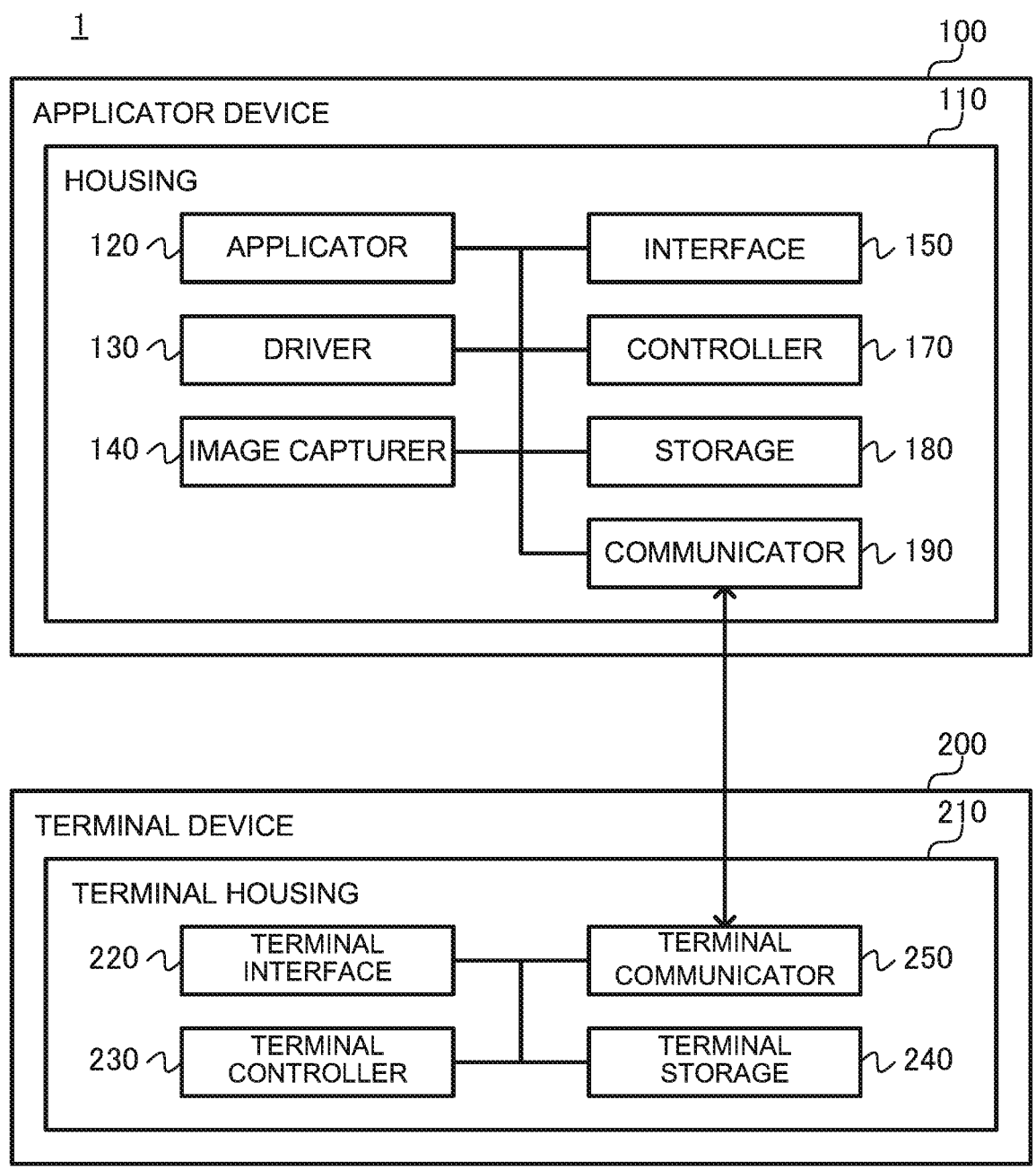
FIG. 6 is a block diagram illustrating a configuration of an applicator system according to Embodiment 2.

FIG. 6 is a block diagram illustrating a configuration of the applicator system 1 according to Embodiment 2. As illustrated in FIG. 6, the configuration of an applicator device 100 of Embodiment 2 is similar to the applicator device 100 of Embodiment 1 except for not including the notifier 160 included in the applicator device 100 of Embodiment 1.

A terminal controller 230 of the terminal device 200 of Embodiment 2, upon receiving image data of the target 2 from the applicator device 100, analyzes the received image data and specifies as a spot area S a portion corresponding to a spot in the image. Specifically, the terminal controller 230 extracts brightness component (brightness information) of the image data of the target 2, and determines that a portion where low brightness points are concentrated is a spot and specifies the portion as the spot area S.

The terminal controller 230 sets detection areas at up and down ends and left and right ends in the image of the target 2. The widths of the detection areas correspond to, for example, one tenth of the short sides of the image of the target 2, and are not limited thereto. When the spot area S overlaps the detection area, the terminal controller 230 controls the terminal interface 220 to display a notification image I indicating that the applicator device 100 is prompted to be moved from the detection area where the spot area S overlaps toward a detection area opposite thereto (notification process).

Figure 7:
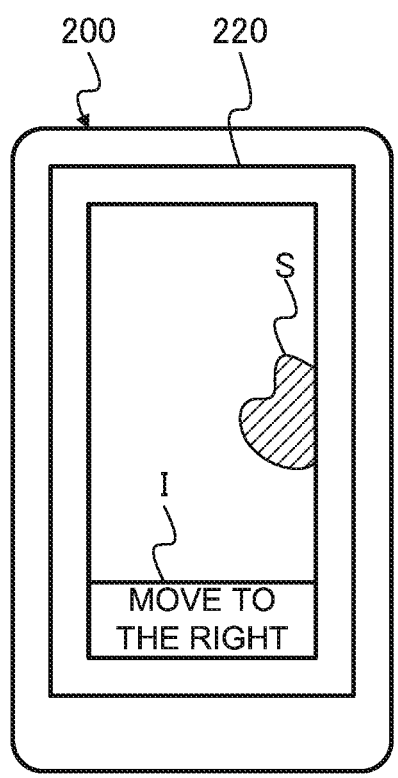
FIG. 7 is a plan view of a terminal device according to Embodiment 2.

FIG. 7 is a plan view of the terminal device 200. When the spot area S moves to the right on the image of the target 2 by the user moving the applicator device 100 to the left, and then the spot area S overlaps the detection area $A_2$ located at the right end portion of the image, the terminal controller 230 controls the terminal interface 220 to display the notification image I saying "move to the right", as illustrated in FIG. 7.

Figure 8:
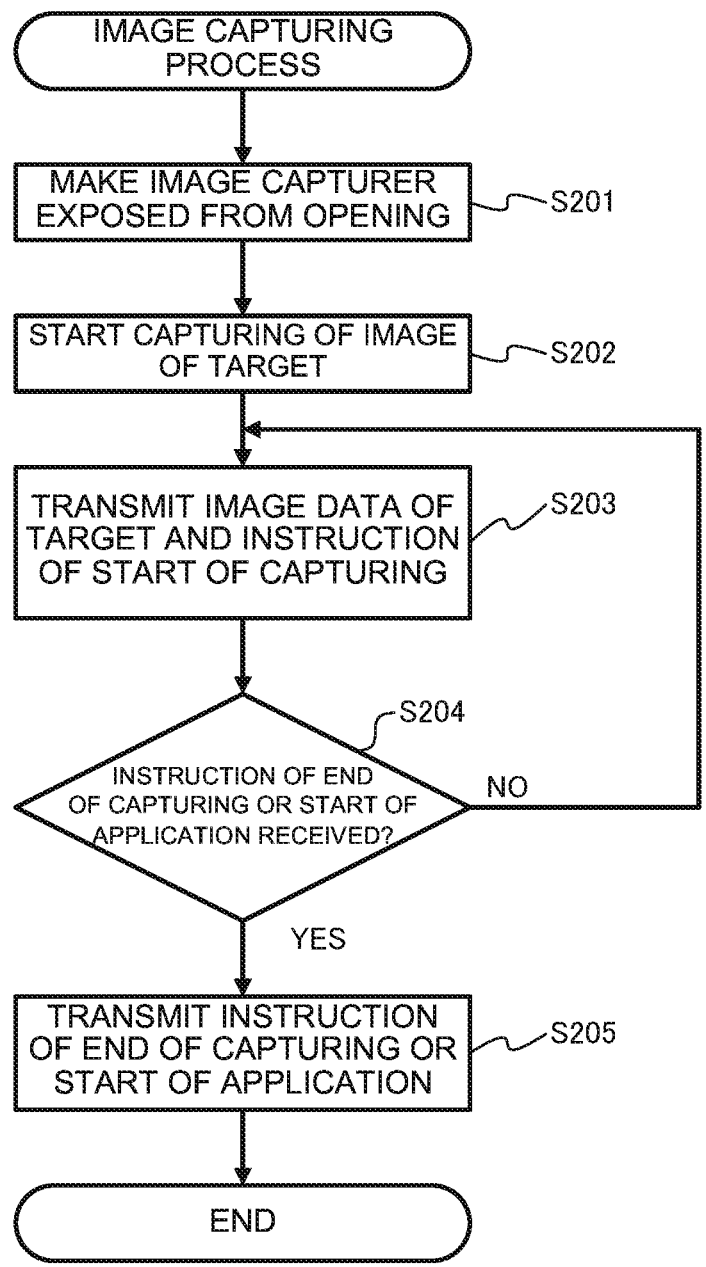
FIG. 8 is a flow chart of an image capturing process executed by an applicator device according to Embodiment 2.

An image capturing process executed by the applicator device 100 included in the applicator system 1 according to Embodiment 2 is described. FIG. 8 is a flow chart of the image capturing process executed by the applicator device 100. The image capturing process is described with reference to the flow chart of FIG. 8.

The image capturing process starts when the interface 150 receives a user instruction of the start of capturing and the controller 170 receives an instruction of the start of capturing from the interface 150. Upon the start of the image capturing process, the controller 170 controls the driver 130 to move the applicator 120 to a position Q and make the image capturer 140 exposed from the opening 111 (Step S201).

Upon the controller 170 controlling the driver 130 to move the applicator 120, the controller 170 controls the image capturer 140 to start capturing the image of the target 2 (Step S202).

Upon starting capturing the image of the target 2, the controller 170 transmits the image data of the target captured via the communicator 190 and the instruction of the start of capturing (Step S203).

Upon transmitting the image data of the target 2, the controller 170 determines whether the interface 150 receives the instruction of the end of capturing or the start of application (Step S204). When the controller 170 determines that the interface 150 does not receive the instruction (No in Step S204), the process returns to Step S203.

When the controller 170 determines that the interface 150 receives the instruction of the end of capturing or the start of application (Yes in Step S204), the controller 170 transmits the instruction of the end of capturing or the start of application via the communicator 190 (Step S205), and the image capturing process ends.

Figure 9:
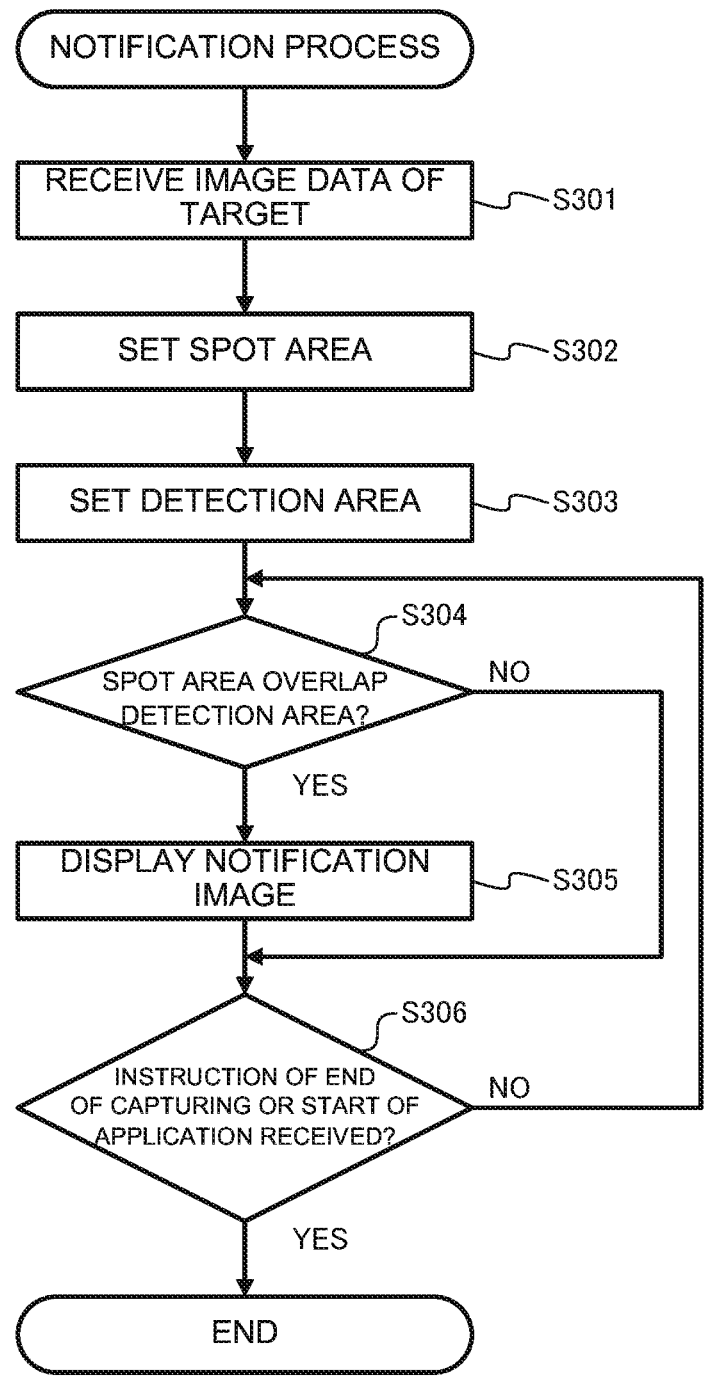
FIG. 9 is a flow chart of a notification process executed by the terminal device according to Embodiment 2.

A notification process executed by the terminal device 200 included in the applicator system 1 according to Embodiment 2 is described. FIG. 9 is a flow chart of the notification process executed by the terminal device 200. The notification process is executed in parallel to the image capturing process executed by the applicator device 100. The notification process is described with reference to the flow chart of FIG. 9.

The notification process starts when the terminal communicator 250 receives the instruction of the start of capturing transmitted from the communicator 190 of the applicator device 100. Upon the start of the notification process, the terminal controller 230 receives the image data of the target 2 via the terminal communicator 250 (Step S301).

Upon receiving the image data of the target 2, the terminal controller 230 analyzes the received image data and specifies a spot area S (Step S302).

Upon specifying the spot area S, the terminal controller 230 sets detection areas at up and down ends and left and right ends in the image of the target 2 (Step S303).

Upon setting the detection areas, the terminal controller 230 determines whether the spot area S overlaps a detection area (Step S304). When the terminal controller 230 determines that the spot area S does not overlap the detection area (No in Step S304), the process proceeds to Step S306.

When the terminal controller 230 determines that the spot area S overlaps the detection area (Yes in Step 304), the terminal controller 230 controls the terminal interface 220 to display the notification image I indicating that the applicator device 100 is prompted to be moved (Step S305), and the process proceeds to Step S306.

The terminal controller 230 determines whether the terminal controller 230 receives the instruction of the end of capturing or the start of application from the applicator device 100 (Step S306). When the terminal controller 230 determines that the terminal controller 230 does not receive the instruction (No in Step S306), the process proceeds to Step S304. When the terminal controller 230 determines that the terminal controller 230 receives the instruction (Yes in Step S306), the notification process ends.

With such a configuration, the applicator system 1 according to Embodiment 2 exhibits the similar effect as that of the applicator system 1 according to Embodiment 1, and in addition to the effect, providing a configuration in which the terminal device 200 is in charge of analysis of the image data and notification to a user also can provide information user-friendly to improve operability.

Embodiment 3

An applicator system 1 according to Embodiment 3 is described with reference to the drawings. The applicator system 1 according to Embodiment 3 does not include a terminal device 200 included in the applicator systems 1 according to Embodiment 1 and 2.

Figure 10:
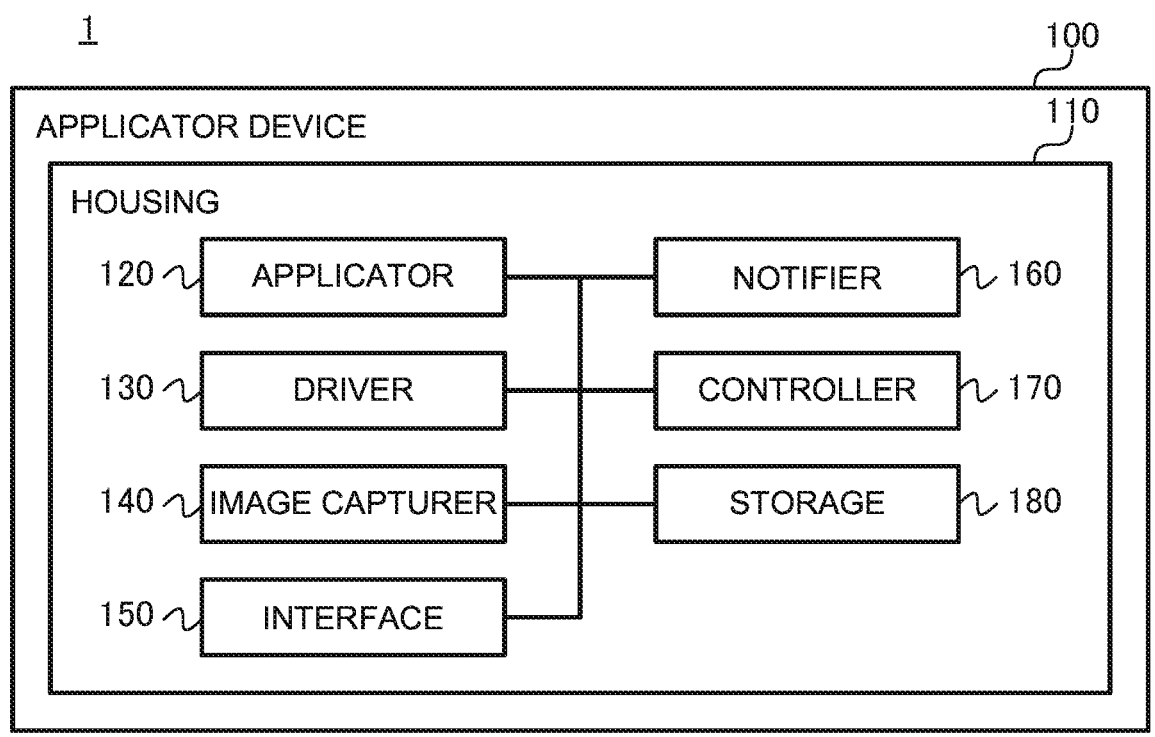
FIG. 10 is a block diagram illustrating a configuration of an applicator system according to Embodiment 3.

FIG. 10 is a block diagram illustrating a configuration of the applicator system 1 according to Embodiment 3. As illustrated in FIG. 10, the applicator system 1 according to Embodiment 3 does not include the terminal device 200. A configuration of the applicator device 100 of Embodiment 3 is similar to the applicator device 100 of Embodiment 1 except for not including the communicator 190 included in the applicator device 100 of Embodiment 1.

Since the applicator system 1 according to Embodiment 3 does not include the configuration for displaying video captured by the image capturer 140, the applicator system 1 does not provide a direct visual check about whether the applicator device 100 has been moved to a place of the target 2 to which the material is to be applied. The applicator system 1 can also guide a user who cannot directly check the target 2 to move the applicator device 100 to a place where the user desires by providing notification by vibration of the notifier 160 when the spot area overlaps the detection area that is the outer periphery of the imaging coverage of the image capturer 140.

With such a configuration, the applicator system 1 according to Embodiment 2 exhibits the similar effect as that of the applicator system 1 according to Embodiment 1.

Variation

Embodiments of the present disclosure are described above, but the embodiments are merely exemplary, and the scope of the present invention is not limited thereto. That is, the embodiments of the present disclosure can be made in various application and any embodiments can fall into the scope of the invention.

The applicator 120 applies a material to a spot area S, but is not limited thereto. The applicator 120 may apply a material to a portion other than the application area.

The interface 150 is described as receiving an input from a user including an instruction of start of capturing, start of application, or end of capturing, but is not limited thereto. The input from the user including the instruction of the start of capturing, the start of application, or the end of capturing may be received by the terminal interface 220.

In the above example, the notification image I saying "move to the right" when the spot area S moves to the right and overlaps the detection area $A_2$ located on the right end, but is not limited thereto. The notification image I may be displayed saying "move to the left". When a user applies the applicator device 100 onto her face, the left for the user is the right for the applicator device 100, and thus such a display may provide the user an intuitive operation. Other notification image I describing another instruction can be displayed.

The notifier 160 may include a vibrating element such as a motor and provide a user notification by vibration, but the notifier 160 is not limited thereto. The notifier 160 may include a projection and an actuator and notify a user with the projection protruded. The notifier 160 may include an optical element such as a light emitting diode (LED) and notify a user with light. In addition, the interface 150 may also have a function of the notifier 160 and notify a user with sound.

The functions according to the present disclosure can be provided in the form of an applicator system preconfigured to implement these functions, and furthermore, an existing applicator device, smartphone, and the like can function as an applicator system according to the present disclosure by application of a program thereto. That is, an existing applicator device, smartphone, and the like can function as the applicator system according to the present disclosure by applying a program for implementing the functions of the applicator system exemplified in the embodiments in such a way that the program can be executed by the CPU or the like that controls the existing applicator device, smartphone, and the like. In addition, the application method according to the present disclosure can be performed using the applicator system.

A method for applying such program can be freely selected. For example, the program may be stored in a computer-readable recording medium such as a flexible disk, a compact disc (CD)-ROM, a digital versatile disc (DVD)-ROM, or a memory card to be applied.

In addition, the program may be superimposed on a carrier wave to be applied via the Internet or any other communication medium. For example, the program may be posted to a bulletin board system (BBS) on a communication network to be distributed. In this case, the information processing device may be configured so that the above-described processes can be executed by starting and executing the program under control of an operating system (OS) as with other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An applicator system comprising:
    an applicator device including a printing head that applies a material to an application area of a target, a camera that captures an image of the target, a first communicator, and a first processor; and
    an external device including a second communicator and a second processor,
    wherein:
    the applicator device and the external device communicate with one another via the first communicator and the second communicator,
    one of the first processor and the second processor specifies the application area in the image of the target,
    the one of the first processor and the second processor sets a detection area around an outer periphery of the image of the target, the detection area being in contact with an outer edge of the image of the target, and
    in a case in which the applicator device and the target are moving relative to one another and it is determined that the specified application area in the image of the target overlaps with the set detection area, the one of the first processor and the second processor performs a notification process to output a notification in response to determining that the specified application area has overlapped with the set detection area.

2. The applicator system according to claim 1, wherein the one of the first processor and the second processor determines whether the specified application area in the image of the target overlaps with the set detection area.

3. The applicator system according to claim 1, further comprising:
    a notifier to provide notification to a user,
    wherein the one of the first processor and the second processor performs the notification process by controlling the notifier in response to determining that the specified application area has overlapped with the set detection area.

4. The applicator system according to claim 3, wherein the notifier provides notification to the user by vibration.

5. The applicator system according to claim 1, wherein the first processor controls the first communicator to transmit the image of the target captured by the camera to the external device, and
    wherein the second processor:
    specifies the application area based on the image of the target received from the application device, and
    performs the notification process in response to determining that the specified application area has overlapped with the set detection area.

6. The applicator system according to claim 1, wherein the first processor performs the notification process by causing the external device, with which the first communicator communicates, to output the notification.

7. The applicator system according to claim 1, wherein the first processor performs the notification process in a case in which the first communicator receives a signal transmitted by the external device in response to a determination by the external device that the specified application area has overlapped with the set detection area.

8. The applicator system according to claim 1, wherein the one of the first processor and the second processor specifies the application area based on brightness information of the image of the target.

9. The applicator system according to claim 1, wherein the printing head applies the material to a portion of the target that corresponds to the specified application area.

10. The applicator system according to claim 1, wherein the printing head moves along a bottom of the applicator device from a position that is out of an angle of view of the camera to a position that is within the angle of view of the camera before applying the material to a portion of the target corresponding to the specified application area.

11. The application system according to claim 1, wherein the one of the first processor and the second processor sets the detection area in the image of the target upon specifying the application area in the image of the target.

* * * * *

UNITED STATES PATENT AND TRADEMARK OFFICE
CERTIFICATE OF CORRECTION

| | | |
|---|---|---|
| PATENT NO. | : 11,416,721 B2 | Page 1 of 1 |
| APPLICATION NO. | : 16/653300 | |
| DATED | : August 16, 2022 | |
| INVENTOR(S) | : Masato Nunokawa | |

It is certified that error appears in the above-identified patent and that said Letters Patent is hereby corrected as shown below:

In the Claims

Column 12, Line 59, Claim 11 delete "application" and insert -- applicator --.

Signed and Sealed this
Seventeenth Day of January, 2023

Katherine Kelly Vidal
*Director of the United States Patent and Trademark Office*